United States Patent
Yi et al.

(10) Patent No.: US 12,513,777 B2
(45) Date of Patent: Dec. 30, 2025

(54) COMMUNICATION METHOD AND APPARATUS FOR SLEEP MODE CONTROL

(71) Applicant: Samsung Electronics Co., Ltd., Suwon-si (KR)

(72) Inventors: Jaehong Yi, Suwon-si (KR); Suhwook Kim, Suwon-si (KR); Sooeun Song, Suwon-si (KR); Changsung Lee, Suwon-si (KR); Hyeondeok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 18/165,661

(22) Filed: Feb. 7, 2023

(65) Prior Publication Data

US 2024/0237131 A1 Jul. 11, 2024

(30) Foreign Application Priority Data

Jan. 9, 2023 (KR) .................. 10-2023-0003013

(51) Int. Cl.
*H04W 76/28* (2018.01)
*H04L 5/00* (2006.01)
*H04W 76/18* (2018.01)

(52) U.S. Cl.
CPC .......... *H04W 76/28* (2018.02); *H04L 5/0055* (2013.01); *H04W 76/18* (2018.02)

(58) Field of Classification Search
CPC . H04W 76/28; H04W 76/18; H04W 52/0212; H04W 52/0229; H04W 52/0274; H04W 72/1273; H04W 72/21; H04W 72/232; H04L 5/0055; H04L 1/1812; Y02D 30/70
USPC ........................................................ 370/311
See application file for complete search history.

(56) References Cited

U.S. PATENT DOCUMENTS

2020/0120596 A1  4/2020  Yu et al.
2020/0221384 A1  7/2020  Ang et al.
(Continued)

FOREIGN PATENT DOCUMENTS

CN         113692042 A     11/2021
KR    10-2022-0045218 A    4/2022
(Continued)

OTHER PUBLICATIONS

Qualcomm, "PDCCH—based power saving channel design", R1-1909275, Aug. 26-30, 2019. (From Applicant's IDS) (Year: 2019).*

(Continued)

*Primary Examiner* — Mang Hang Yeung
(74) *Attorney, Agent, or Firm* — Jefferson IP Law, LLP

(57) ABSTRACT

The disclosure relates to a 5th generation (5G) communication system or a 6th generation (6G) communication system for supporting higher data rates beyond a 4th generation (4G) communication system, such as long term evolution (LTE). A method of a base station (BS) for sleep mode control is provided. The method includes transmitting scheduled downlink (DL) data to a user equipment (UE), detecting one or more consecutive discontinuous transmissions (DTX) at feedback timing corresponding to the DL data, transmitting downlink control information (DCI) including a wake-up confirming message (WCM) to the UE in response to the detection of the consecutive DTX, and determining that the UE is in wake-up mode based on reception of an acknowledgment (ACK) corresponding to the WCM from the UE.

18 Claims, 17 Drawing Sheets

(56) References Cited

U.S. PATENT DOCUMENTS

| | | | |
|---|---|---|---|
| 2020/0245395 A1 | 7/2020 | Zhang et al. | |
| 2021/0045056 A1* | 2/2021 | Nam | H04W 52/0216 |
| 2021/0068055 A1* | 3/2021 | Nam | H04L 5/0091 |
| 2021/0392584 A1* | 12/2021 | Reial | H04W 76/28 |
| 2022/0286966 A1* | 9/2022 | Zhao | H04W 68/00 |
| 2022/0287071 A1 | 9/2022 | Seo et al. | |

FOREIGN PATENT DOCUMENTS

| | | |
|---|---|---|
| KR | 10-2022-0047768 A | 4/2022 |
| KR | 10-2022-0144706 A | 10/2022 |

OTHER PUBLICATIONS

NEC, Discussion on network energy saving techniques, R1-2209425, 3GPP TSG RAN WG1 #110bis-e, Sep. 30, 2022.

Nokia et al., Network Energy Saving Techniques, R1-2208519, 3GPP TSG RAN WG1 Meeting #110bis-e, Sep. 30, 2022.

CATT, Offline Discussion Summary of PDCCH-based Power Saving Signal/Channel, R1-1909799,3GPP TSG RAN WG1 Meeting #98, Sep. 3, 2019.

Huawei, Report of [POST119-e][313][NES] Details of solutions (Huawei), R2-2210417, 3GPP TSG RAN WG2 #119bis-e, Sep. 30, 2022.

Qualcomm Incorporated, PDCCH-based power saving channel design, R1-1909275, 3GPPTSG-RAN WG1 #98, Aug. 17, 2019.

International Search report dated Sep. 21, 2023, issued in International Application No. PCT/KR2023/001746.

\* cited by examiner

| Field (Item) | Bits | Reference |
|---|---|---|
| 802 — Identifier for DCI formats | 1 | |
| 804 — Prev. Scheduled PDCCH Indicator1, Prev. Scheduled PDCCH Indicator2, ... Prev. Scheduled PDCCH Indicator_N | Variable | Offset between subframes of current transmission and prev. scheduled PDCCH |

COMMUNICATION METHOD AND APPARATUS FOR SLEEP MODE CONTROL

CROSS-REFERENCE TO RELATED APPLICATION(S)

This application is based on and claims priority under 35 U.S.C. § 119(a) of a Korean patent application number 10-2023-0003013, filed on Jan. 9, 2023, in the Korean Intellectual Property Office, the disclosure of which is incorporated by reference herein in its entirety.

BACKGROUND

1. Field

The disclosure relates to a communication method and apparatus for sleep mode control. More particularly, the disclosure relates to a method and apparatus for controlling a discontinuous reception (DRX) operation based on sleep mode prediction.

2. Description of Related Art

Considering the development of wireless communication from generation to generation, the technologies have been developed mainly for services targeting humans, such as voice calls, multimedia services, and data services. Following the commercialization of 5th generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz band (for example, 95 gigahertz (GHz) to 3 terahertz (THz) bands). It is expected that, due to severer path loss and atmospheric absorption in the terahertz bands than those in millimeter wave (mm-Wave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for controlling a discontinuous reception (DRX) operation based on sleep mode prediction.

Another aspect of the disclosure is to provide a method and apparatus for controlling sleep mode for physical control channel (PDCCH) monitoring.

Another aspect of the disclosure is to provide a method and apparatus for recovering failure of sleep mode prediction.

Another aspect of the disclosure is to provide a method and apparatus for confirming or notifying sleep mode of a user equipment (UE).

Additional aspects will be set forth in part in the description which follows and, in part, will be apparent from the description, or may be learned by practice of the presented embodiments.

In accordance with an aspect of the disclosure, a method of a base station (BS) for sleep mode control is provided. The method includes transmitting scheduled downlink (DL) data to a user equipment (UE), detecting one or more consecutive discontinuous transmissions (DTX) at feedback timing corresponding to the DL data, transmitting downlink control information (DCI) including a wake-up confirming message (WCM) to the UE in response to the detection of the consecutive DTX, and determining that the UE is in wake-up mode based on reception of an acknowledgment (ACK) corresponding to the WCM from the UE.

In accordance with another aspect of the disclosure, an apparatus of a BS for sleep mode control is provided. The apparatus includes a transceiver and a processor coupled to the transceiver. The processor may be configured to transmit scheduled DL data to a UE, detect one or more consecutive DTX at feedback timing corresponding to the DL data, transmit DCI including a WCM to the UE in response to the detection of the consecutive DTX, and determine that the UE is in wake-up mode based on reception of an acknowledgment (ACK) corresponding to the WCM from the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a diagram illustrating a downlink control information (DCI) format representing a WCM according to an embodiment of the disclosure;

Throughout the drawings, it should be noted that like reference numbers are used to depict the same or similar elements, features, and structures.

DETAILED DESCRIPTION

Figure 1:
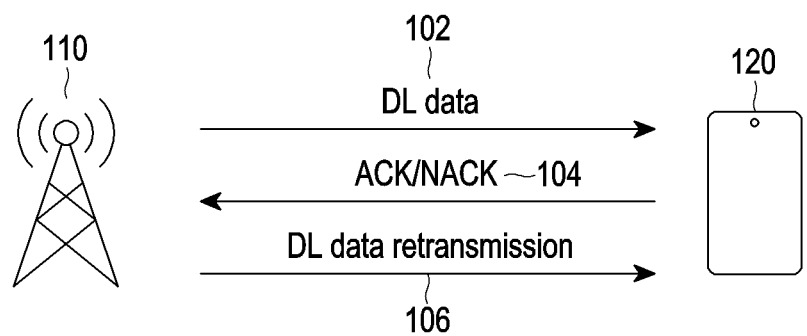
FIG. 1 is a diagram illustrating downlink (DL) data transmission according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the attached drawings. Further, the drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. Although the terms described later are defined in consideration of functions in the disclosure, the terms may be changed according to the intention of a user or an operator, or customs. Therefore, the definitions should be made by the meanings of each term lying within.

It will be understood that each block of the flowchart illustrations and combinations of the flowchart illustrations can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function specified in the flowchart block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions specified in the flowchart block(s).

Furthermore, each block may represent part of a module, a segment, or code including one or more executable instructions for performing specific logic function(s). Moreover, it should be noted that the functions of the blocks may be performed in a different order in several modified implementations. For example, two successive blocks may be performed substantially at the same time, or may be performed in reverse order according to their functions.

The term "unit or part" as used herein means, but is not limited to, a software or hardware component, such as a field programmable gate array (FPGA) or application specific integrated circuit (ASIC), which performs certain tasks. A "unit or part" may be configured to reside on an addressable storage medium and configured to be executed on one or more processors. Thus, a "unit or part" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processors (CPUs) in a device or a secure multimedia card. Further, a "unit or part" may include one or more processors in an embodiment.

In the disclosure, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. Such terms as "1st" and "2nd" or "first" and "second" may be used to simply distinguish a corresponding component from another, and does not limit the components in other aspect (e.g., importance or order).

Beyond the initial voice-centered service, wireless communication systems are evolving into broadband wireless communication systems that provide high-speed, high-quality packet data services, such as 3rd generation partnership project (3GPP) communication standards including high speed packet access (HSPA), long term evolution (LTE) or evolved universal terrestrial radio access (E-UTRA), LTE-advanced (LTE-A), and LTE-Pro, and 3GPP2 standards including high rate packet data (HRPD), ultra mobile broadband (UMB), and IEEE 802.16e.

A representative example of the broadband wireless communication systems, LTE adopts orthogonal frequency division multiplexing (OFDM) for downlink (DL) and single carrier frequency division multiple access (SC-FDMA) for uplink (UL). UL refers to a radio link on which a UE transmits data or a control signal to a base station (BS) (e.g., an evolved Node B (eNode B)), and DL refers to a radio link on which a BS transmits data or a control signal to a UE. In the above multiple access schemes, data or control information of each user may be identified by allocating and operating time-frequency resources to carry the data or the control information in such a manner that they do not overlap, that is, orthogonality is established between them.

In the disclosure, a BS may be, as an entity responsible for resource allocation for a UE, at least one of a next-generation Node B (gNode B or gNB), an eNode B (or eNB), a Node B, a radio access unit, a BS controller, or a network node. The BS may be a network entity including at least one of an integrated access and backhaul (IAB)-donor which is a gNB providing network access to a UE through backhaul and access links and an IAB-node which is a radio access network (RAN) node supporting new radio (NR) access link(s) to UE(s) and supporting NR backhaul links to the IAB-donor or another IAB-node in a wireless communication system (e.g., an NR system). A UE may be at least one of a terminal, a mobile station (MS), a cellular phone, a smartphone, a computer, or a multimedia system capable of performing a communication function. The UE may wirelessly access an IAB-node and transmit and receive data to and from an IAB-donor connected to at least one IAB-node through a backhaul link.

For convenience of description, terms and names as defined in the 3GPP standards (standards of 5th generation (5G), NR, LTE, or a similar system) may be used. However, the disclosure may be equally applied to systems conforming to other standards, not limited to the terms and names. Further, the disclosure is not limited to terms used in the following embodiments of the disclosure, and other terms indicating objects of the same technological meanings may also be used.

FIG. 1 is a diagram illustrating downlink (DL) data transmission according to an embodiment of the disclosure.

Referring to FIG. 1, a BS (e.g., gNB) 110 may transmit DL data (e.g., at least one transport block (TB)) to a UE 120 on a scheduled resource (e.g., a physical downlink shared channel (PDSCH)) in operation 102. While not shown, the gNB 110 may transmit downlink control information (DCI) including resource assignment information of the PDSCH via a physical downlink control channel (PDCCH) in a specified control resource region prior to transmission of the PDSCH (e.g., operation 102).

In operation 104, the UE 120 may transmit a response (e.g., hybrid automatic repeat request-acknowledgement (HARQ-ACK)) indicating successful reception or reception fail of the DL data to the gNB 110 according to an HARQ scheme. In an embodiment of the disclosure, the UE 120 may transmit the HARQ-ACK in a specified resource (e.g., a feedback timing) corresponding to a transmission timing of the PDSCH. In an embodiment of the disclosure, the HARQ-ACK may be carried on a physical uplink control channel (PUCCH) or physical uplink shared channel (PUSCH) transmitted by the UE 120.

In operation 106, the gNB 110 may transmit retransmission data corresponding to the DL data of operation 102 to the UE 120 based on the HARQ-ACK. In an embodiment of the disclosure, the retransmission data may be carried in a specified resource (e.g., a DL retransmission timing) corresponding to the transmission timing of the PDSCH.

Figure 2:
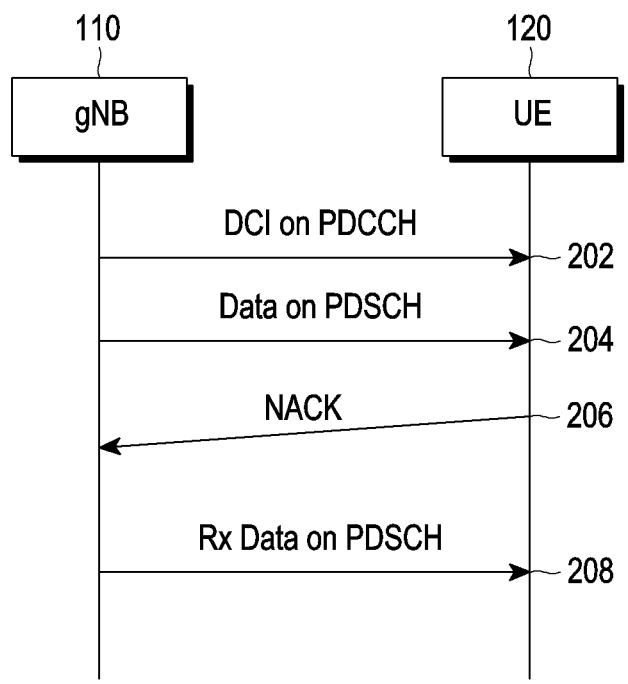
FIG. 2 is a sequence diagram illustrating DL scheduling and DL data transmission according to an embodiment of the disclosure.

FIG. 2 is a sequence diagram illustrating DL scheduling and data transmission according to an embodiment of the disclosure.

Referring to FIG. 2, the gNB 110 may determine DL data transmission for the UE 120 by scheduling and transmit resource assignment information indicating resources (e.g., a PDSCH) allocated for the DL data transmission to the UE 120 on a PDCCH in operation 202. In an embodiment of the disclosure, the DCI may include at least one of the resource assignment information for the DL data (e.g., a time-frequency resource assignment for the PDSCH), information (e.g., a modulation and coding scheme (MCS) and a redundancy version (RV)) required to decode the DL data by the UE 120, or information indicating a feedback timing related to HARQ-ACK transmission. In an embodiment of the disclosure, the DCI may be masked with an identifier (e.g., a radio network temporary identifier (RNTI)) assigned to the UE 120. The UE 120 may receive the DCI on the PDCCH using the RNTI which is already known. The UE 120 may continuously perform PDCCH monitoring in a control resource region to determine whether there is scheduled data transmission and detect a PDCCH having the RNTI of the UE 120 through the PDCCH monitoring.

In operation 204, the gNB 110 may transmit DL data (e.g., at least one TB) on the PDSCH indicated by the DCI. The UE 120 may receive the DL data on the PDSCH indicated by the DCI. The UE 120 may check whether the DL data has been received without an error by demodulating and decoding the DL data. When failing in successfully receiving the DL data without an error as a result of the check, the UE 120 may determine a negative acknowledgment (NACK).

In operation 206, the UE 120 may transmit an HARQ-ACK including the NACK to request retransmission of the DL data at a feedback timing corresponding to the PDSCH. The gNB 110 may determine DL retransmission based on reception of the HARQ-ACK including the NACK. While not shown, the gNB 110 may determine the DL retransmission based on detection of a discontinuous transmission (DTX) at a reception timing of the HARQ-ACK (e.g., the feedback timing). In an embodiment of the disclosure, when a signal strength measured in a frequency resource corresponding to the feedback timing is less than a predetermined threshold, the gNB 110 may determine that a DTX has been detected.

In operation 208, the gNB 110 may transmit retransmission data corresponding to the DL data of operation 202 to the UE 120 based on the detection of the NACK or DTX.

Figure 3:
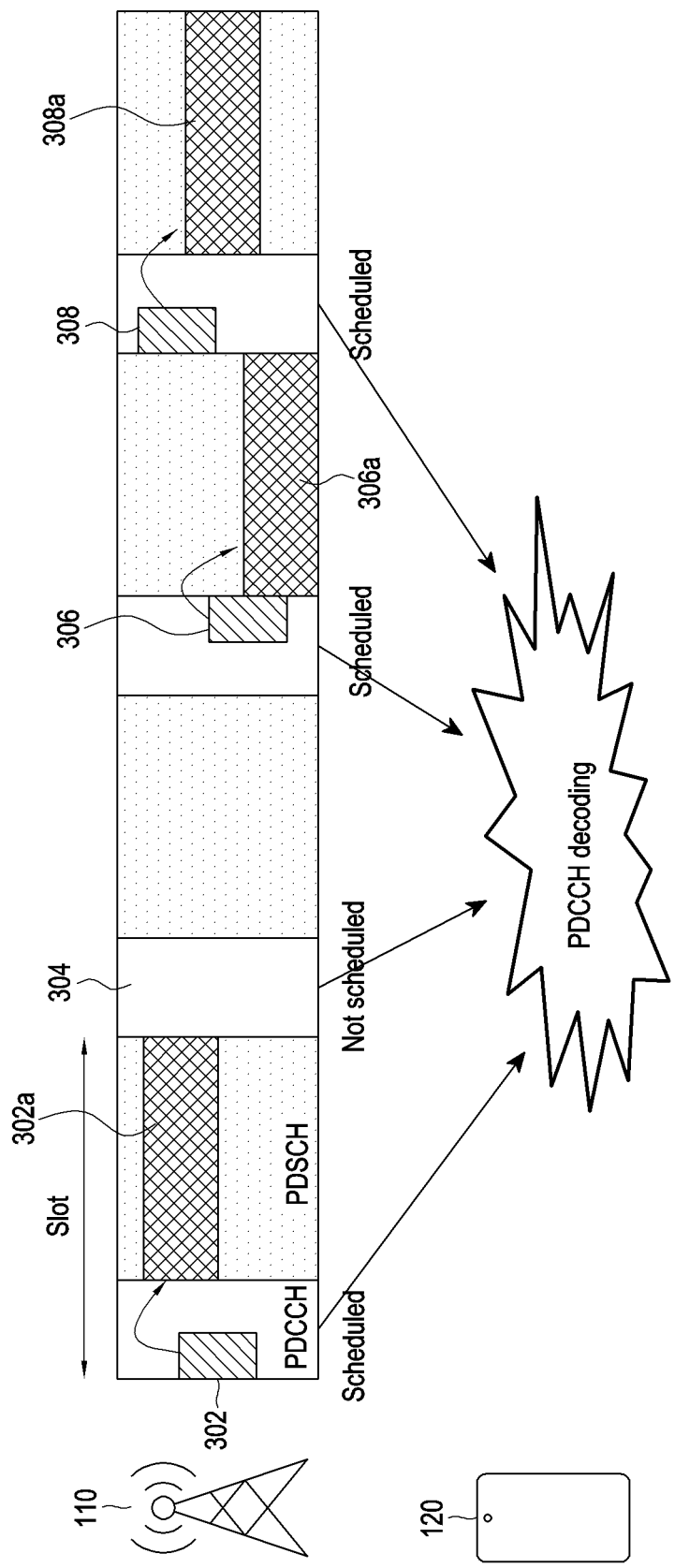
FIG. 3 is a diagram illustrating physical downlink control channel (PDCCH) monitoring according to an embodiment of the disclosure.

FIG. 3 is a diagram illustrating PDCCH monitoring according to an embodiment of the disclosure.

Referring to FIG. 3, the gNB 110 may transmit a PDCCH including DCI for at least one UE in a control resource region allocated at the start of every transmission time interval (TTI) (e.g., slot, subframe, or orthogonal frequency division multiplexing (OFDM) symbol). According to an embodiment of the disclosure, the gNB 110 may transmit a PDCCH 302 for the UE 120 in a control resource region of a first slot. The PDCCH 302 may carry DCI including resource assignment information about a PDSCH (e.g., a PDSCH 302*a*) scheduled for the UE 120. The UE 120 may detect the PDCCH 302 by performing PDCCH monitoring (e.g., reception and decoding) in the control resource region of the first slot.

In a second slot, the gNB 110 may not schedule DL transmission (e.g., DL data transmission) for the UE 120 (304). Since the UE 120 is not aware that a PDCCH for the UE 120 is not transmitted in the second slot, the UE 120 may monitor (e.g., receive and decode) a PDCCH in a control resource region of the second slot and determine PDCCH detection failure.

In a third slot, the gNB 110 may transmit a PDCCH (e.g., a PDCCH 306) including resource assignment information for the UE 120. The UE 120 may detect the PDCCH 306 by performing PDCCH monitoring (e.g., reception and decoding) in a control resource region of the third slot and receive a PDSCH 306*a* indicated by the resource assignment information in the PDCCH 306.

In a fourth slot, the gNB 110 may transmit a PDCCH (e.g., a PDCCH 308) including resource assignment information for the UE 120. The UE 120 may detect the PDCCH 308 by performing PDCCH monitoring (e.g., reception and decoding) in a control resource region of the fourth slot and receive a PDSCH 308*a* indicated by the resource assignment information in the PDCCH 308.

Performing PDCCH monitoring in every slot to identify whether DL transmission is scheduled may cause large energy consumption in the UE 120. The UE 120 may operate in discontinuous reception (DRX) mode to reduce unnecessary PDCCH decoding under a specified condition (e.g., low traffic). The DRX mode may include a wake-up period and a sleep period. The sleep period may mean that when the UE 120 has no data to receive or transmit in radio resource control (RRC) connected mode, the UE 120 reduces battery consumption by deactivating (e.g., sleeping) a transceiver (e.g., a transceiver 1804). During the sleep period, the UE 120 may not perform PDCCH monitoring. During the wake-up period, the UE 120 in the RRC connected mode may perform PDCCH monitoring to identify uplink (UL) or DL data transmission.

Performing PDCCH monitoring in every slot even though the UE 120 is not scheduled in a situation where a traffic load is not small may cause unnecessary battery consumption. The UE 120 may operate in sleep mode or wake up based on prediction of the appearance of DCI including scheduling information in each slot. For example, the UE 120 may skip PDCCH monitoring by sleeping in the second slot predicted to be unscheduled (304).

Figure 4:
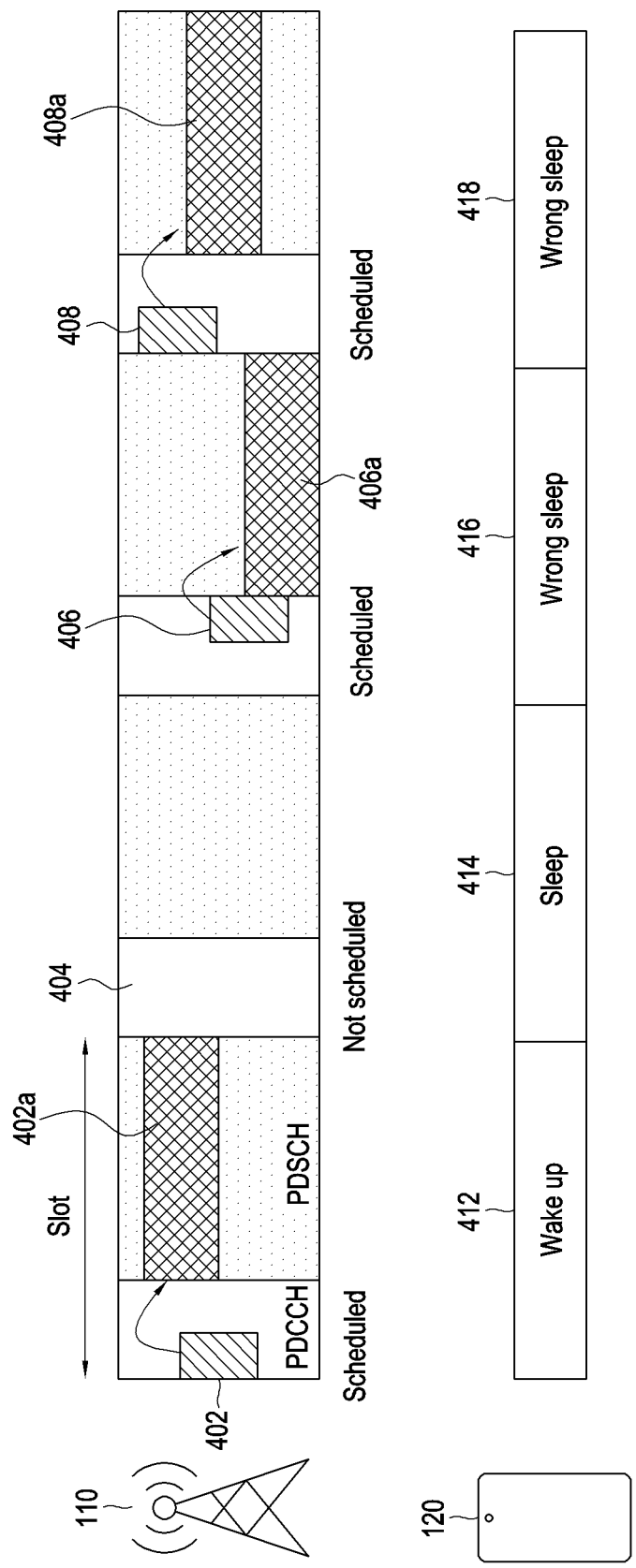
FIG. 4 is a diagram illustrating prediction-based sleep mode control according to an embodiment of the disclosure.

FIG. 4 is a diagram illustrating prediction-based sleep mode control according to an embodiment of the disclosure.

Referring to FIG. 4, the gNB 110 may transmit a PDCCH 402 and a PDSCH 402*a* for the UE 120 in a first slot. In the first slot, the UE 120 may operate in wake-up mode 412 and detect the PDCCH 402 by performing PDCCH monitoring (e.g., reception and decoding) in a control resource region of the first slot. In a second slot, the gNB 110 may not schedule DL transmission for the UE 120 (404). In third and fourth slots, the gNB 110 may transmit PDCCHs (e.g., PDCCHs 406 and 408) including resource assignment information for the UE 120.

The UE 120 may predict whether each slot is scheduled through an artificial intelligence (AI) algorithm for sleep mode prediction and sleep in the second, third slot, and fourth slots based on the prediction. In the second slot, since the UE 120 operates in sleep mode 414 and a PDCCH for the UE 120 is not transmitted, PDCCH missing does not occur.

In the third slot, the UE 120 may operate in sleep mode 416 according to wrong prediction and thus miss the PDCCH 406 transmitted by the gNB 110. Although the gNB 110 expects a feedback on a PDSCH 406a at a corresponding feedback timing (not shown) after transmitting the PDSCH 406a based on the PDCCH 406, the UE 120 that has not detected the PDCCH 406 does not transmit any HARQ-ACK. Therefore, unnecessary DL retransmission occurs due to non-detection of the HARQ-ACK.

Likewise, the UE 120 may operate in sleep mode 418 according to wrong prediction and thus miss the PDCCH 408 transmitted by the gNB 110 in the fourth slot. Although the gNB 110 expects a feedback on a PDSCH 408a at a corresponding feedback timing (not shown) after transmitting the PDSCH 408a based on the PDCCH 408, the UE 120 that has not detected the PDCCH 408 does not transmit any HARQ-ACK. Therefore, the gNB 110 may perform unnecessary DL retransmission based on detection of DTX at the feedback timing.

In an embodiment of the disclosure, the gNB 110 may transmit DCI (e.g., a wake-up confirming message (WCM)) to identify whether the UE 120 is out of the sleep mode. The WCM may include failure time information (e.g., a failure time offset in slots or subframes) indicating a time at which DL transmission has failed (e.g., a slot position of a PDSCH for which an HARQ-ACK has not been received) before the gNB 110 transmits the WCM.

In an embodiment of the disclosure, the gNB 110 may transmit a temporary wake-up indication signal (WUS) to the UE 120 to indicate a remaining wake-up period of the UE 12 after receiving an ACK for the WCM. The WUS may include a value indicating a relative position of a last slot in which the UE 120 is to wake up based on a time (e.g., slot) at which the WUS is transmitted.

In an embodiment of the disclosure, the UE 120 may transmit uplink control information (UCI) (e.g., a wake-up notification message (WNM)) to indicate that the UE 120 is out of the sleep mode. The WNM may be transmitted on a UL channel (e.g., PUCCH or PUSCH) at a time when the UE 120 switches from the prediction-based sleep mode to the wake-up mode.

Figure 5:
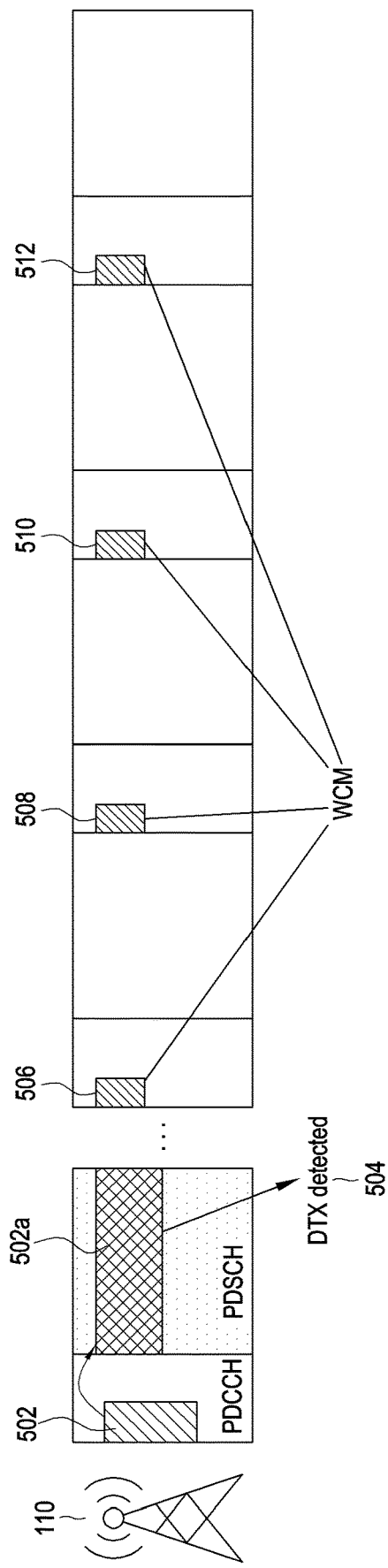
FIG. 5 is a diagram illustrating transmission of a wake-up confirming message (WCM) according to an embodiment of the disclosure.

FIG. 5 is a diagram illustrating transmission of a WCM according to an embodiment of the disclosure.

Referring to FIG. 5, the gNB 110 may transmit a PDCCH 502 in a control resource region of a first slot (e.g., an $n^{th}$ slot), and the PDCCH 502 may carry DCI including resource assignment information indicating that a PDSCH 502a is scheduled for the UE 120. The gNB 110 may presume that the UE 120 is in the sleep mode based on detection of a DTX 504 at a feedback timing corresponding to the PDSCH 502a. In an embodiment of the disclosure, based on detection of N consecutive DTXs (e.g., the DTX 504) during N slots (e.g., $(n-N+1)^{th}$ to $n^{th}$ slots), the gNB 110 may determine that the UE 120 is in the wrong sleep mode (e.g., the sleep mode 416 or the sleep mode 418). In an embodiment of the disclosure, N may include a fixed value or a value configurable by the gNB 110. In an embodiment of the disclosure, the gNB 110 may discontinue DL data scheduling for the UE 120 based on the detection of the DTX N consecutive times.

In a second slot (e.g., an $(n+1)^{th}$ slot) following the first slot, the gNB 110 may transmit DCI including a WCM 506 on a PDCCH to the UE 120 to identify whether the UE 120 is in the sleep mode. In an embodiment of the disclosure, the WCM 506 may be transmitted based on the detection of the N consecutive DTXs (e.g., the DTX 504) before the second slot. In an embodiment of the disclosure, the DCI including the WCM 506 may not be accompanied by a PDSCH, and the gNB 110 may not increase an HARQ RV after transmitting the DCI including the WCM 506.

The gNB 110 may transmit WCMs 508, 510, and 512 in third, fourth, and fifth slots (e.g., $(n+2)^{th}$, $(n+3)^{th}$, and $(n+4)^{th}$ slots), respectively. In an embodiment of the disclosure, the gNB 110 may transmit the WCM 506, 508, 510, or 512 repeatedly in a control resource region of every slot until receiving an ACK corresponding to the at least one of the WCM 506, 508, 510, or 512. In an embodiment of the disclosure, at least one of a transmission period (e.g., a slot interval), a transmission frequency, or a transmission number of the WCM 506, 508, 510, or 512 may be predetermined or configured by higher-layer signaling. The gNB 110 may perform DL retransmission (e.g., retransmission data corresponding to the PDSCH 502a) based on reception of an ACK corresponding to the at least one of the WCM 506, 508, 510, or 512. In an embodiment of the disclosure, the gNB 110 may discontinue DL data scheduling for the UE 120 until before receiving the ACK corresponding to the at least one of the WCM 506, 508, 510, or 512 after the N consecutive DTXs are detected.

In an embodiment of the disclosure, the WCM 506, 508, 510, or 512 may be unicast or multicast to one or more UEs (e.g., the UE 120) which may be placed in the wrong sleep mode. When the UE 120 is in the wake-up mode, it may receive the WCM 506, 508, 510, or 512 and transmit an ACK for the WCM 506, 508, 510, or 512 to the gNB 110 to indicate that the UE 120 is in the wake-up mode. When the UE 120 is in the wrong sleep mode, it may not receive the WCM 506, 508, 510, or 512, and transmit an ACK for the WCM 506, 508, 510, or 512 to the gNB 110 by receiving the WCM 506, 508, 510, or 512 after waking up. The gNB 110 may individually perform sleep mode control for each UE (e.g., the UE 120) using the WCM 506, 508, 510, or 512.

Figure 6:
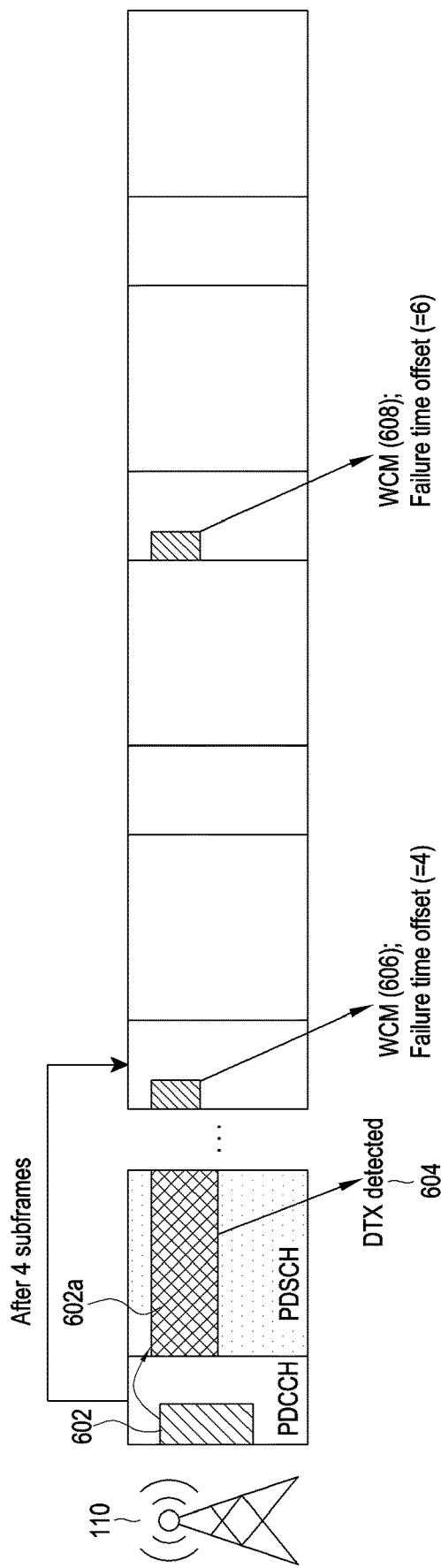
FIG. 6 is a diagram illustrating an operation of transmitting failure time information in a WCM according to an embodiment of the disclosure.

FIG. 6 is a diagram illustrating an operation of transmitting failure time information in a WCM according to an embodiment of the disclosure.

Referring to FIG. 6, the gNB 110 may transmit a PDCCH 602 in a control resource region of a first slot (e.g., an $n^{th}$ slot), and the PDCCH 602 may carry DCI including resource assignment information indicating that a PDSCH 602a is scheduled for the UE 120. The gNB 110 may detect a DTX 604 at a feedback timing corresponding to the PDSCH 602a. In an embodiment of the disclosure, the gNB 110 may determine that the UE 120 is in the wrong sleep mode (e.g., the sleep mode 416 or the sleep mode 418) based on detection of N consecutive DTXs (e.g., the DTX 604) during N slots (e.g., $(n-5)^{th}$ to $n^{th}$ slots), respectively.

In a second slot (e.g., an $(n+4)^{th}$ slot) following the first slot, the gNB 110 may transmit DCI including a WCM 606 on a PDCCH to the UE 120 based on the detection of the N consecutive DTXs (e.g., the DTX 604). In an embodiment of the disclosure, the WCM 606 may include failure time information (e.g., a failure time offset) indicating a time (e.g., the $n^{th}$ slot) at which the gNB 110 has detected transmission failures (e.g., N consecutive DTXs). For example, the failure time offset may be set to an offset (e.g., 4) between the $(n+4)^{th}$ slot and the $n^{th}$ slot.

In a third slot (e.g., an $(n+6)^{th}$ slot) following the second slot, the gNB 110 may transmit DCI including a WCM 608 on a PDCCH to the UE 120 based on non-reception of an ACK for the WCM 606. The WCM 608 may include failure time information (e.g., a failure time offset) indicating a time (e.g., the $n^{th}$ slot) at which the gNB 110 has detected transmission failures (e.g., the N consecutive DTXs). For example, the failure time offset may be set to an offset (e.g., 6) between the $(n+6)^{th}$ slot and the $n^{th}$ slot.

Figure 7:
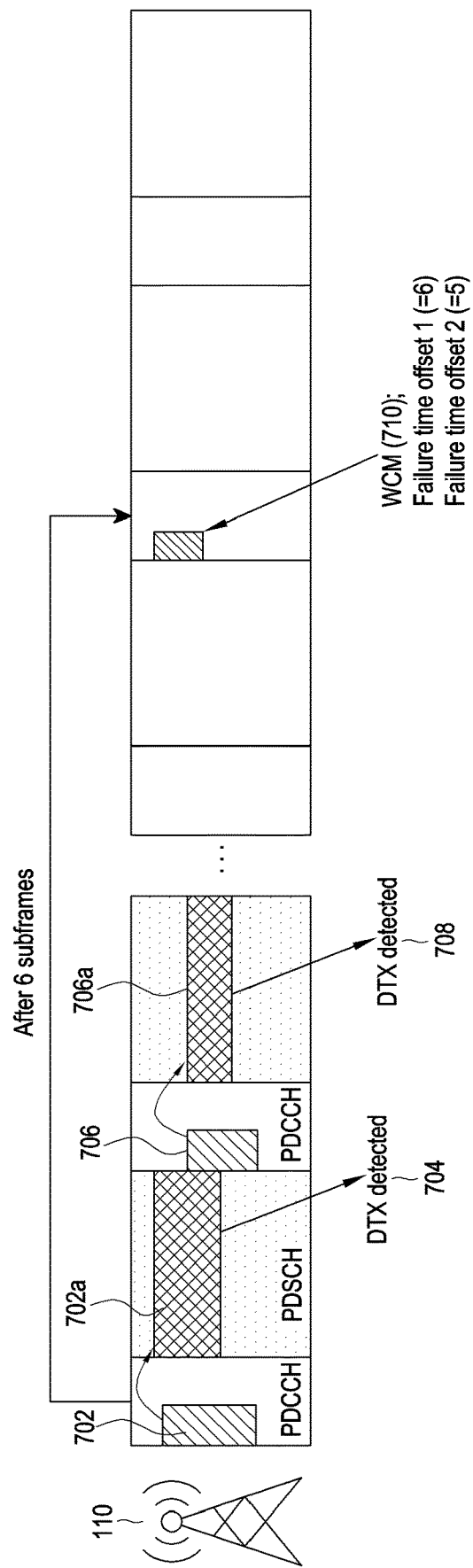
FIG. 7 is a diagram illustrating an operation of transmitting a plurality of failure time offsets in a WCM according to an embodiment of the disclosure.

FIG. 7 is a diagram illustrating an operation of transmitting a plurality of failure time offsets in a WCM according to an embodiment of the disclosure.

Referring to FIG. 7, the gNB 110 may transmit a PDCCH 702 in a control resource region of an $n^{th}$ slot, and the PDCCH 702 may carry DCI including resource assignment information indicating that a PDSCH 702a in the $n^{th}$ slot is scheduled for the UE 120. The gNB 110 may detect a DTX 704 at a feedback timing corresponding to the PDSCH 702a. The gNB 110 may transmit a PDCCH 706 in a control resource region of a next slot (e.g., an $(n+1)^{th}$ slot), and the PDCCH 706 may carry DCI including resource assignment information indicating that a PDSCH 706a in the $(n+1)^{th}$ slot is scheduled for the UE 120. The gNB 110 may detect a DTX 708 at a feedback timing corresponding to the PDSCH 706a.

In an embodiment of the disclosure, the gNB 110 may determine that the UE 120 is in the wrong sleep mode (e.g., the sleep mode 416 or the sleep mode 418) based on detection of N consecutive DTXs (e.g., the DTX 704 and the DTX 708) during N slots (e.g., the $n^{th}$ slot and the $(n+1)^{th}$ slot), respectively.

In an $(n+6)^{th}$ slot, the gNB 110 may transmit DCI including a WCM 710 to the UE 120 on a PDCCH based on the detection of the N consecutive DTXs (e.g., the DTX 704 and the DTX 708). In an embodiment of the disclosure, the WCM 710 may include failure time information (e.g. two failure time offsets) indicating times (e.g., the $n^{th}$ slot and the $(n+1)^{th}$ slot) at which the gNB 110 has detected transmission failures (e.g., the N consecutive DTXs). For example, a first failure time offset may be set to an offset (e.g., 6) between the $(n+6)^{th}$ slot and the $n^{th}$ slot, and a second failure time offset may be set to an offset (e.g., 5) between the $(n+6)^{th}$ slot and the $(n+1)^{th}$ slot.

While not shown, the gNB 110 may transmit DCI including a new WCM to the UE 120 on a PDCCH based on non-reception of an ACK for the WCM 710 in a subsequent slot (e.g., an $(n+x)^{th}$ slot). The new WCM may include failure time information (e.g., a plurality of failure time offsets) indicating times (e.g., the $n^{th}$ slot and the $(n+1)^{th}$ slot) at which the gNB 110 has detected transmission failures. In an embodiment of the disclosure, each failure time offset may be set to an offset from the $(n+x)^{th}$ slot. The gNB may include one or more failure time offsets for all transmission failures (e.g., one or more DTXs) in a WCM.

FIG. 8 is a diagram illustrating a DCI format representing a WCM according to an embodiment of the disclosure.

Referring to FIG. 8, a DCI format (e.g., DCI format 4_0) 800 representing a WCM may include a DCI format identifier 802 (e.g., 1 bit) and at least one previously scheduled PDCCH indicator 804 corresponding to at least one failure time offset (e.g., previously scheduled PDCCH indicator 1, previously scheduled PDCCH indicator 2, and previously scheduled PDCCH indicator N). Each previously scheduled PDCCH indicator may include a slot offset (or subframe offset) between a current PDCCH transmission carrying the DCI format 800 and a previously scheduled PDCCH. In an embodiment of the disclosure, the previously scheduled PDCCH may include DCI previously scheduling a PDSCH for the UE 120.

In an embodiment of the disclosure, the UE 120 may be assigned an RNTI (e.g., an RNTI for a WCM (WCM RNTI (W-RNTI)) by a gNB (e.g., the gNB 110) and detect DCI including the WCM (e.g., the DCI format 800) using the W-RNTI.

Figure 9:
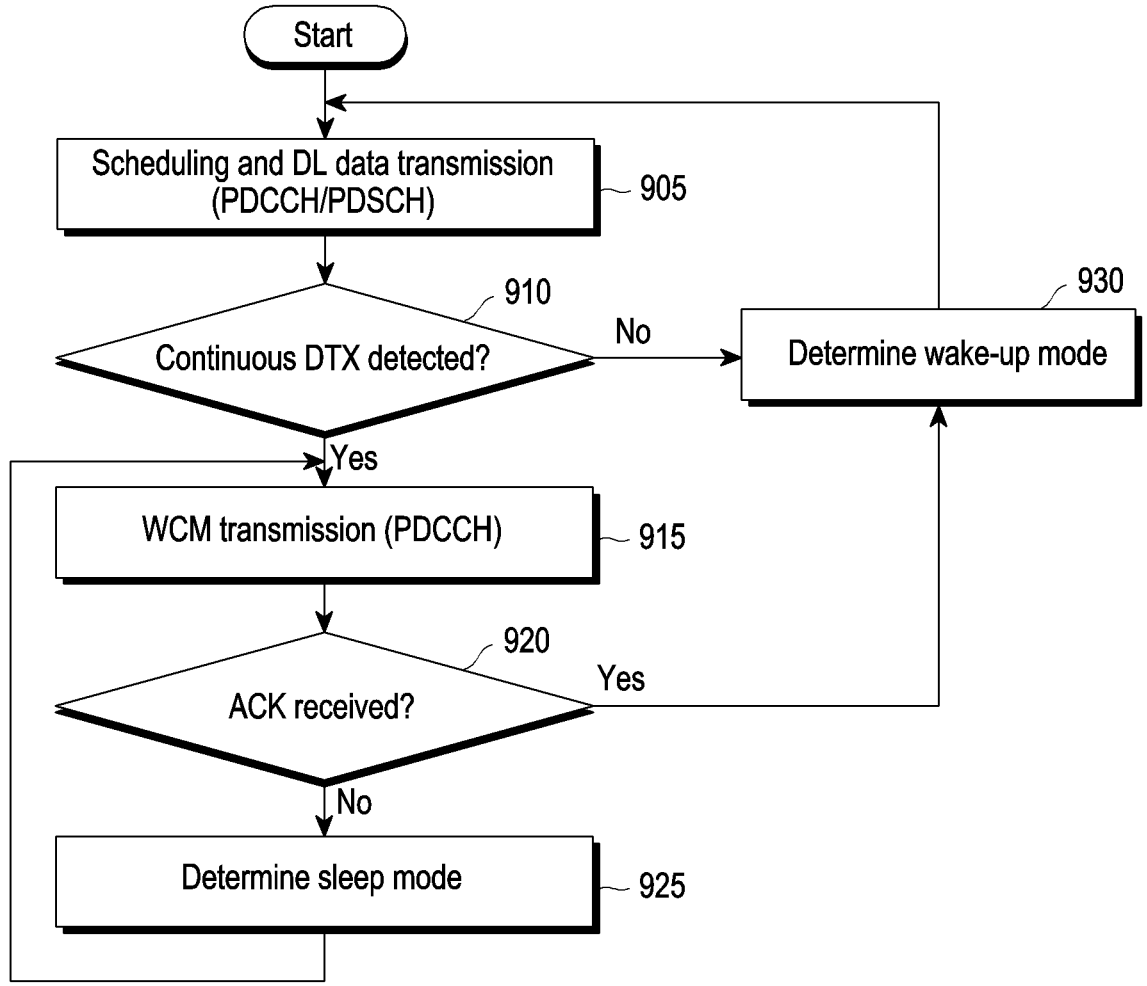
FIG. 9 is a flowchart illustrating an operation of a next-generation Node B (gNB) for transmitting a WCM according to an embodiment of the disclosure.

FIG. 9 is a flowchart illustrating an operation of the gNB 110 for transmitting a WCM according to an embodiment of the disclosure.

Referring to FIG. 9, a gNB (e.g., the gNB 110) may transmit DL data for a UE (e.g., the UE 120) in operation 905. In an embodiment of the disclosure, operation 905 may include scheduling DL data transmission, transmitting DCI including resource assignment information related to the scheduled DL data transmission on a PDCCH (e.g., the PDCCH 502), and transmitting the scheduled DL data on a PDSCH (e.g., the PDSCH 502a) corresponding to the resource assignment information by the gNB 110. In an embodiment of the disclosure, operation 905 may include at least N DL data transmissions.

In operation 910, the gNB 110 may determine whether N consecutive DTXs (e.g., the DTX 504) have been detected. In an embodiment of the disclosure, the gNB 110 may detect N consecutive DTXs at feedback timings corresponding to the at least N DL data transmissions of operation 905. When N consecutive DTXs are not detected, the gNB 110 may determine that the UE 120 is in the wake-up mode in operation 930 and return to operation 905. Upon detection of N consecutive DTXs, the gNB 110 may proceed to operation 915.

In operation 915, the gNB 110 may transmit DCI (e.g., the DCI format 800) including a WCM on a PDCCH. In an embodiment of the disclosure, the DCI including the WCM may be masked with a W-RNTI and then transmitted. In an embodiment of the disclosure, the DCI may include failure time information (e.g., one or more failure time offsets or one or more previously scheduled PDCCH indicators 804) indicating time positions (e.g., slots) at which the N consecutive DTXs have been detected.

In operation 920, the gNB 110 may determine whether an ACK corresponding to the WCM has been received. The ACK may be received on a PUCCH or a PUSCH at a reception timing corresponding to the transmission of the DCI including the WCM, for example. Upon receipt of the ACK, the gNB 110 may determine that the UE 120 is in the wake-up mode in operation 930 and return to operation 905. While not shown, the gNB 110 may perform DL retransmission corresponding to at least one DL data transmission detected as a DTX in operation 910 based on the reception of the ACK. When the ACK is not received, the gNB 110 may determine that the UE 120 is in the sleep mode in operation 925 and proceed to operation 915 to transmit a WCM again.

While not shown, operations 915, 920, and 925 may be repeated until a maximum number of transmissions of the WCM is reached. When the ACK is not received until the maximum number of transmissions of the WCM is reached, the gNB 110 may perform a specified error process (e.g., end the DL data transmission).

Figure 10:
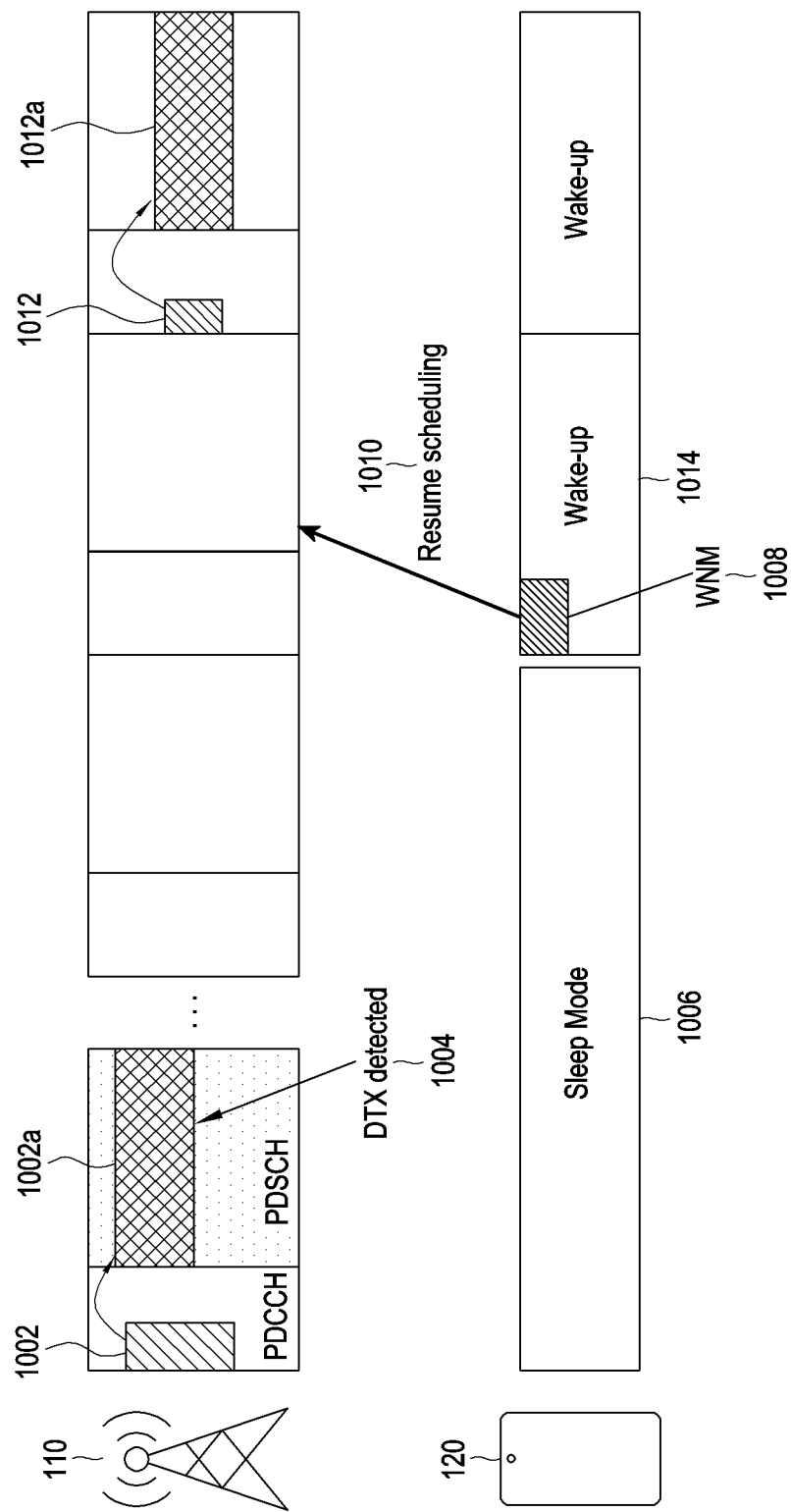
FIG. 10 is a diagram illustrating transmission of a wake-up notification message (WNM) according to an embodiment of the disclosure.

FIG. 10 is a diagram illustrating transmission of a WNM according to an embodiment of the disclosure.

Referring to FIG. 10, the gNB 110 may transmit a PDCCH 1002 in a control resource region of a first slot, and the PDCCH 1002 may carry DCI including resource assignment information indicating that a PDSCH 1002a in the first slot is scheduled for the UE 120. The gNB 110 may determine that the UE 120 is in the wrong sleep mode based on detection of a DTX 1004 at a feedback timing corresponding to the PDSCH 1002a. The gNB 110 may discontinue the DL scheduling for the UE 120 while determining that the UE 120 is in the wrong sleep mode. In an embodiment of the disclosure, the gNB 110 may not schedule DL transmission for the UE 120 until receiving a WNM (e.g., a WNM 1008) from the UE 120.

The UE 120 may operate in sleep mode 1006 during at least one slot including the first slot through an AI algorithm for sleep mode prediction. The UE 120 may determine to discontinue the sleep mode 1006 based on the sleep mode prediction. At a time when the sleep mode 1006 ends and wake-up mode 1014 starts (e.g., a first slot of the wake-up mode 1014), the UE 120 may transmit the WNM 1008. In an embodiment of the disclosure, the WNM 1008 may include 1 bit for the UE 120 to indicate that the UE 120 starts the wake-up mode 1014. In an embodiment of the disclosure, the WNM 1008 may be transmitted on a PUCCH or a PUSCH. The gNB 110 may determine to resume scheduling 1010 for the UE 120 based on the reception of the WNM 1008.

In a slot after the WNM 1008 is received, the gNB 110 may transmit a PDCCH 1012 in a control resource region based on the DL scheduling, and the PDCCH 1012 may carry DCI including resource assignment information indicating that a PDSCH 1012a in the slot is scheduled for the UE 120.

Figure 11:
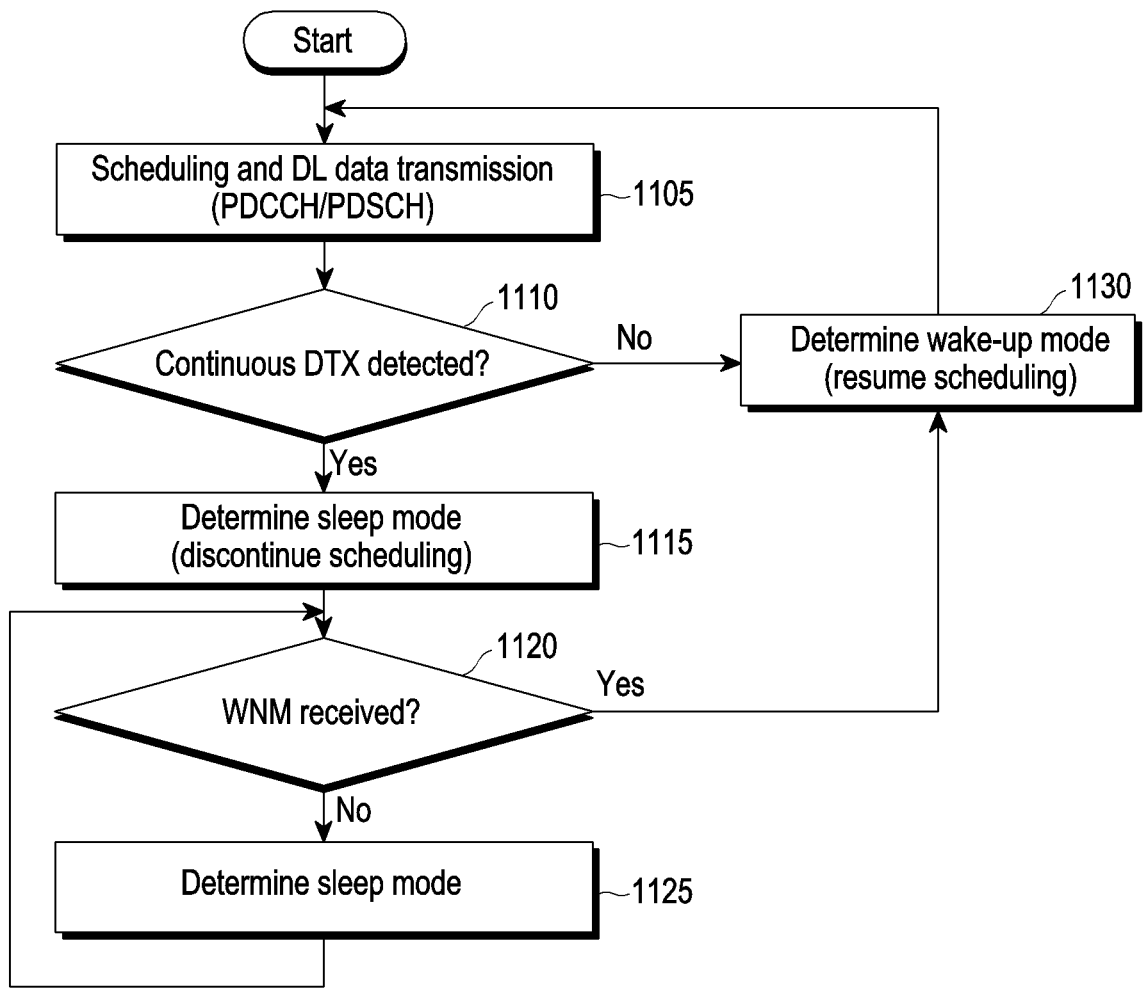
FIG. 11 is a flowchart illustrating an operation of a gNB for receiving a WNM according to an embodiment of the disclosure.

FIG. 11 is a flowchart illustrating an operation of the gNB 110 for receiving a WNM according to an embodiment of the disclosure.

Referring to FIG. 11, a gNB (e.g., the gNB 110) may transmit DL data to a UE (e.g., the UE 120) in operation 1105. According to an embodiment of the disclosure, operation 1105 may include scheduling DL data transmission, transmitting DCI including resource assignment information related to the scheduled DL data transmission on a PDCCH (e.g., the PDCCH 1002), and transmitting the scheduled DL data on a PDSCH (e.g., the PDSCH 1002a) corresponding to the resource assignment information by the gNB 110. In an embodiment of the disclosure, operation 1105 may include at least N DL data transmissions.

In operation 1110, the gNB 110 may determine whether N consecutive DTXs (e.g., the DTX 1004) have been detected. In an embodiment of the disclosure, the gNB 110 may detect N consecutive DTXs at feedback timings corresponding to the at least N DL data transmissions of operation 1105. When N consecutive DTXs are not detected, the gNB 110 may determine that the UE 120 is in the wake-up mode in operation 1130 and return to operation 1105. Upon detection of N consecutive DTXs, the gNB 110 may proceed to operation 1115.

In operation 1115, the gNB 110 may discontinue the DL scheduling for the UE 120, determining that the UE 120 is in the sleep mode. In an embodiment of the disclosure, the gNB 110 may not schedule DL transmission for the UE 120 until before receiving a WCM (e.g., the WNM 1008).

In operation 1120, the gNB 110 may determine whether a WNM has been received from the UE 120. The WNM may be received on a PUCCH or a PUSCH in a first slot of the wake-up mode based on a determination that the UE 120 will discontinue the sleep mode. Upon receipt of the WNM, the gNB 110 may proceed to operation 1130 to resume the DL scheduling for the UE 120, determining that the UE 120 has switched to the wake-up mode. While not shown, the gNB 110 may perform DL retransmission corresponding to at least one DL data transmission detected as a DTX in operation 1110 based on the reception of the WNM. When the WNM is not received, the gNB 110 may determine that the UE 120 is in the sleep mode in operation 1125 and proceed to operation 1120 to await reception of a WNM.

While not shown, operations 1120 and 1125 may be repeated during a specified time. When a time during which scheduling is discontinued exceeds a threshold, the gNB 110 may perform a specified error process (e.g., end the DL data transmission).

In an embodiment of the disclosure, the gNB 110 may use a WUS to indicate whether there is DL data to be transmitted to the UE 120. One bit of the WUS may be set to a value indicating no wake-up (e.g. '0') or a value indicating wake-up (e.g., '1'). In an embodiment of the disclosure, DCI including the WUS may be masked with a power saving RNTI (PS-RNTI) and transmitted (e.g., broadcast) on a PDCCH. The DCI including the WUS may not be accompanied by a PDSCH and may include a plurality of WUSs corresponding to a plurality of UEs. The plurality of UEs may perform PDCCH monitoring using the PS-RNTI, and upon receipt of the WUS, wake up collectively.

Figure 12:
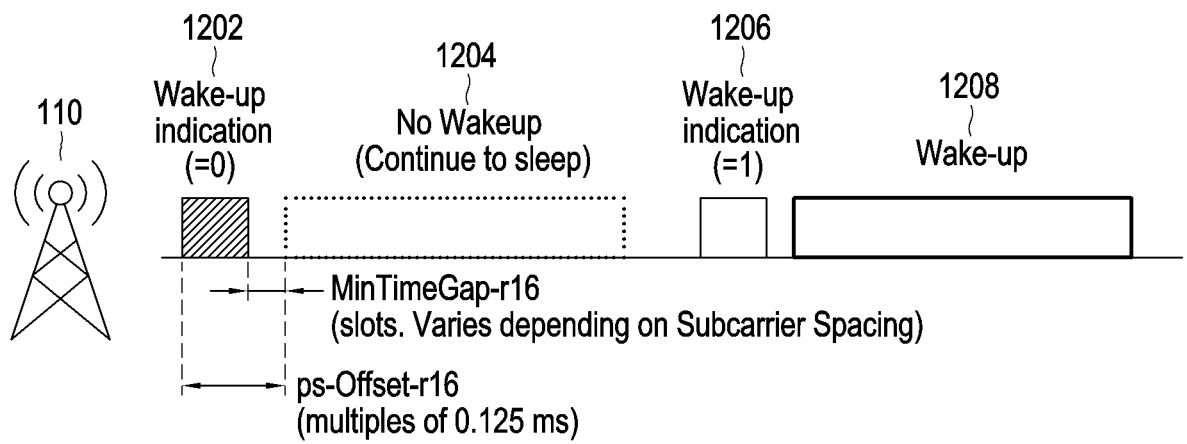
FIG. 12 is a diagram illustrating transmission of a wake-up indication signal (WUS) according to an embodiment of the disclosure.

FIG. 12 is a diagram illustrating transmission of a WUS according to an embodiment of the disclosure.

Referring to FIG. 12, when the gNB 110 does not have DL data to be transmitted to the UE 12, the gNB 110 may transmit DCI including a WUS 1202 instructing no wake-up (e.g., DCI format 2_6) to the UE 120 on a PDCCH. One bit of the WUS 1202 may include a value indicating no wake-up (e.g., '0'). The UE 120 may be kept in sleep mode 1204 to save energy, starting from a specified time gap (e.g., 'Min TimeGap-r16') after receiving the WUS 1202.

When the gNB 110 recognizes generation of DL data to be transmitted to the UE 120, the gNB 110 may transmit DCI (e.g., DCI format 2_6) including a WUS 1206 to the UE 120 on a PDCCH. The WUS 1206 may include a value (e.g., '1') instructing the UE 120 to wake up and receive DL data during a specified time period (e.g., an 'OnDuration' period). After receiving the WUS 1206, the UE 120 may operate in wake-up mode 1208 during the 'OnDuration' period.

Figure 13:
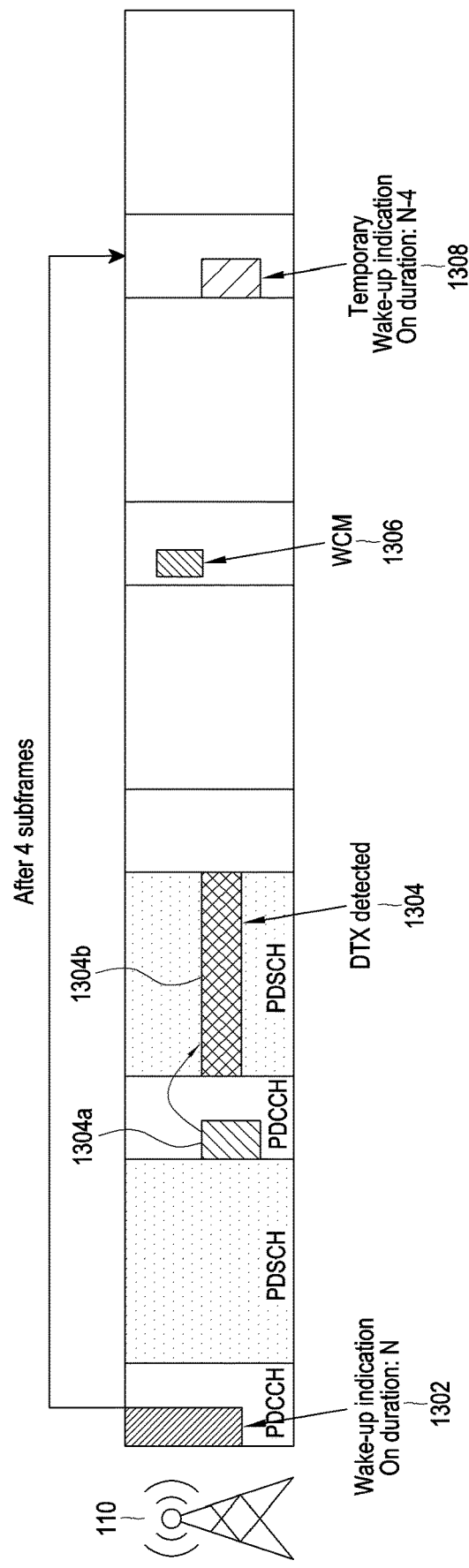
FIG. 13 is a diagram illustrating transmission of a temporary WUS according to an embodiment of the disclosure.

FIG. 13 is a diagram illustrating transmission of a temporary WUS according to an embodiment of the disclosure.

Referring to FIG. 13, the gNB 110 may broadcast a WUS 1302 set to a value indicating wake-up (e.g., '1') in an $n^{th}$ slot. The UE 120 may wake up during a specified time period (e.g., 'OnDuration' period=N slots) based on detection of DCI including the WUS 1302.

The gNB 110 may transmit a PDCCH 1304a in a control resource region of an $(n+1)^{th}$ slot, and the PDCCH 1304a may carry DCI including resource assignment information indicating that a PDSCH 1304b (e.g., in the $(n+1)^{th}$ slot) is scheduled for the UE 120. The gNB 110 may detect a DTX 1304 at a feedback timing corresponding to the PDSCH 1304b.

In a subsequent slot (e.g., an $(n+3)^{th}$ slot), the gNB 110 may transmit DCI including a WCM 1306 to the UE 120 on a PDCCH based on detection of N consecutive DTXs (e.g., the DTX 1304). The UE 120 may receive the WCM 1306 after predicted sleep mode ends.

The gNB 110 may transmit (e.g., broadcast or unicast) a temporary WUS 1308 to a UE (e.g., the UE 120) that does not know a next 'OnDuration' period due to wrong sleep mode in one slot (e.g., an $(n+4)^{th}$ slot) after transmitting the WCM 1306. In an embodiment of the disclosure, the temporary WUS 1308 may include information (e.g., N−4)

indicating a remaining period of the 'OnDuration' period indicated by the WUS 1302. In an embodiment of the disclosure, the DCI including the temporary WUS 1308 may be masked with a PS-RNTI or a W-RNTI and transmitted on a PDCCH.

While not shown, in another embodiment of the disclosure, the gNB 110 may discontinue DL data scheduling for the UE 120 and await reception of a WNM (e.g., the WNM 1008), based on detection of N consecutive DTXs (e.g., the DTX 1304). The gNB 110 may transmit a temporary WUS (e.g., the temporary WUS 1308) in a next slot based on reception of a WNM from the UE 120. The temporary WUS 1308 may include information indicating a remaining OnDuration period for the UE 120.

Figure 14:
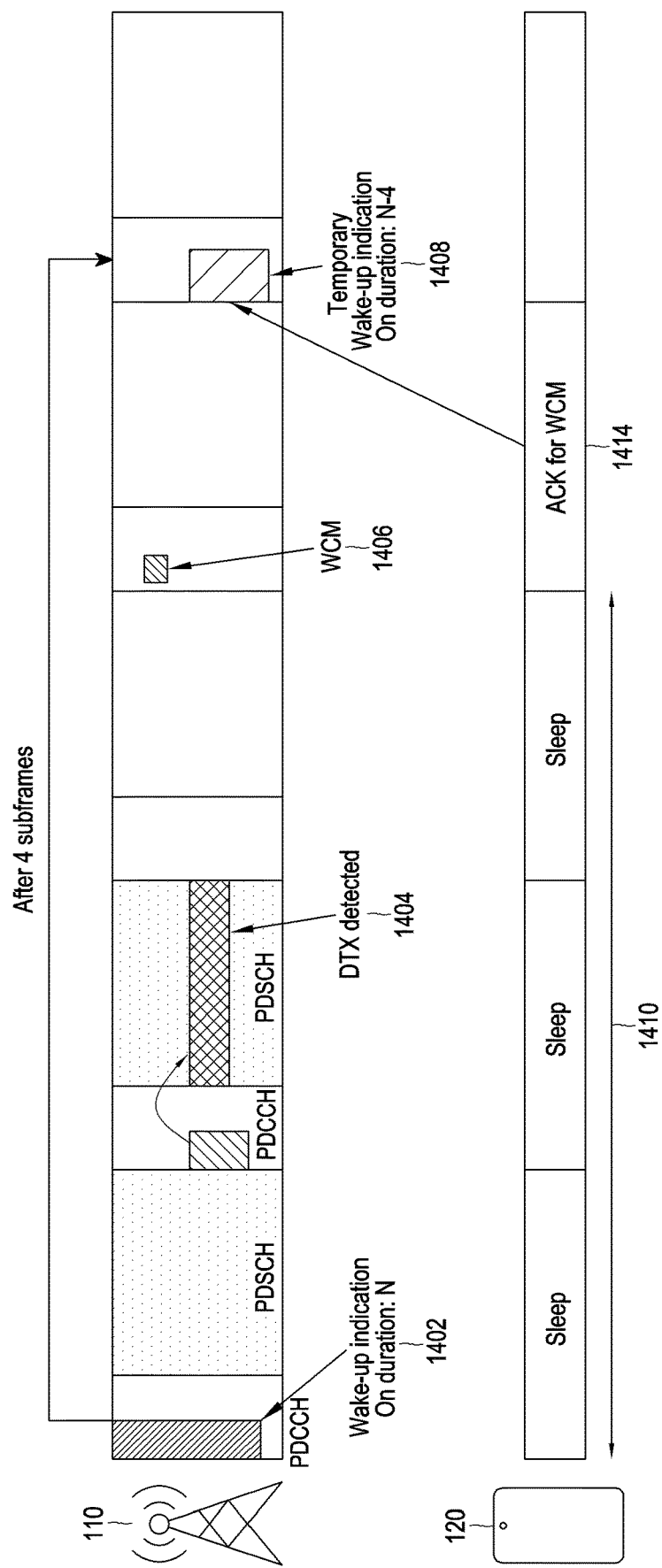
FIG. 14 is a diagram illustrating sleep mode control based on a temporary WUS according to an embodiment of the disclosure.

FIG. 14 is a diagram illustrating sleep mode control based on a temporary WUS according to an embodiment of the disclosure.

Referring to FIG. 14, the gNB 110 may broadcast a WUS 1402 set to a value indicating wake-up (e.g., '1') in an $n^{th}$ slot. The UE 120 may wake up during a specified time period (e.g., 'OnDuration' period=N slots) based on detection of DCI including the WUS 1402.

The gNB 110 may transmit a PDCCH in a control resource region of an $(n+1)^{th}$ slot, and the PDCCH may carry DCI including resource assignment information indicating that a PDSCH (e.g., in the $(n+1)^{th}$ slot) is scheduled for the UE 120. The gNB 110 may detect a DTX 1404 at a feedback timing corresponding to the PDSCH.

In a subsequent slot (e.g., an $(n+3)^{th}$ slot), the gNB 110 may transmit DCI including a WCM 1406 to the UE 120 on a PDCCH based on detection of N consecutive DTXs (e.g., the DTX 1404). The UE 120 may receive the WCM 1406 after predicted sleep mode 1410 ends, and transmit an ACK 1414 for the WCM 1406 to the gNB 110. The gNB 110 may receive the ACK 1414 corresponding to the WCM 1406 from the UE 120.

After receiving the ACK 1414, the gNB 110 may transmit (e.g., broadcast or unicast) a temporary WUS 1408 to the UE 120 that does not know a next 'OnDuration' period due to wrong sleep mode (e.g., the sleep mode 1410) in an $(n+4)^{th}$ slot. In an embodiment of the disclosure, the temporary WUS 1408 may include information (e.g., N–4) indicating a remaining period of an 'OnDuration' period indicated by the WUS 1402. In an embodiment of the disclosure, the DCI including the temporary WUS 1408 may be masked with a PS-RNTI and then broadcast or may be masked with a W-RNTI and then unicast to the UE 120. In an embodiment of the disclosure, the gNB 110 may update the 'OnDuration' period of the UE 120 through the temporary WUS 1408 or may terminate the 'OnDuration' period early.

Figure 15:
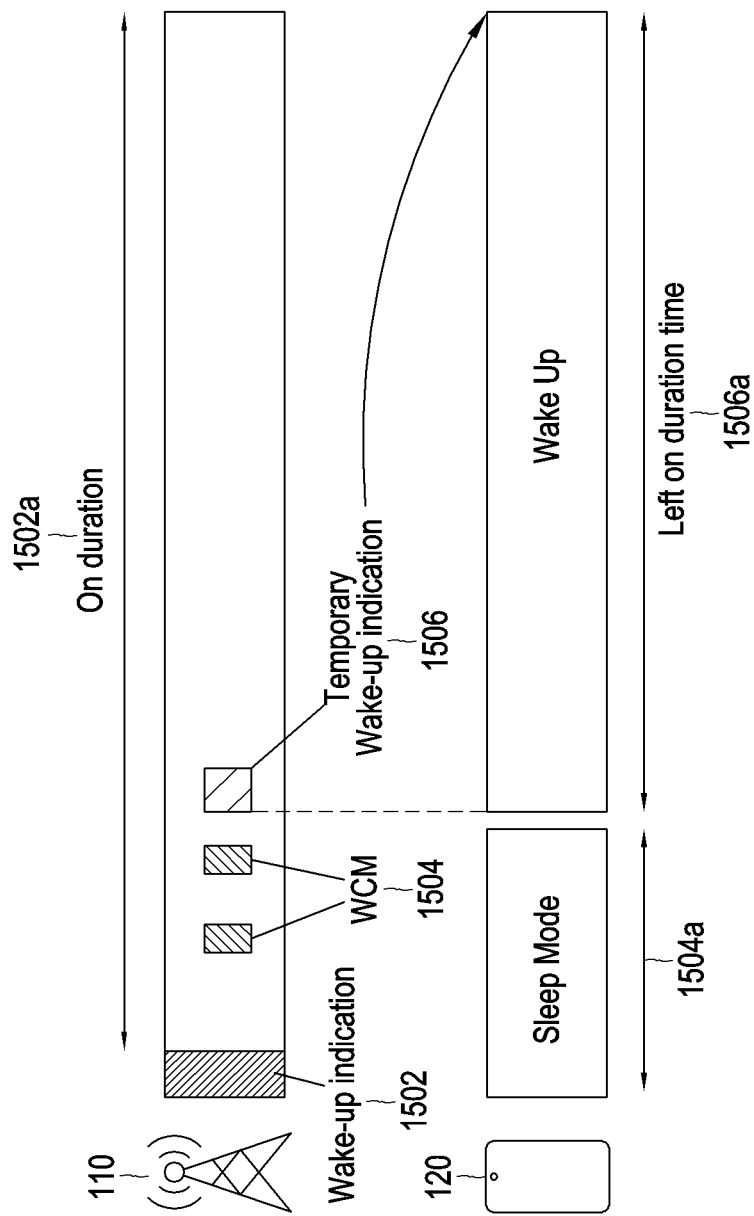
FIG. 15 is a diagram illustrating discontinuous reception (DRX) control based on a temporary WUS according to an embodiment of the disclosure.

FIG. 15 is a diagram illustrating DRX control based on a temporary WUS according to an embodiment of the disclosure.

Referring to FIG. 15, the gNB 110 may instruct the UE 120 to wake up during an 'OnDuration' period 1502a of a specified length by a WUS 1502. The gNB 110 may transmit at least one WCM 1504 to the UE 120 based on detection of consecutive DTXs (not shown) caused by wrong sleep mode 1504a of the UE 120. The gNB 110 may transmit a temporary WUS 1506 to the UE 120 based on reception of an ACK (not shown) corresponding to the at least one WCM 1504.

The UE 120 may end the sleep mode 1504a and start wake-up mode 1506a based on detection of DCI including the temporary WUS 1506. In an embodiment of the disclosure, the temporary WUS 1506 may include information (e.g., N-x) indicating a remaining period of the 'OnDuration' period 1502a (e.g., N) indicated by the WUS 1502 after the transmission of the temporary WUS 1506. Herein, x may represent an offset between a slot in which the WUS 1502 is transmitted and a slot in which the temporary WUS 1506 is transmitted. The UE 120 may operate in the wake-up mode until an ending point of the 'OnDuration' period 1502a based on the temporary WUS 1606.

Figure 16:
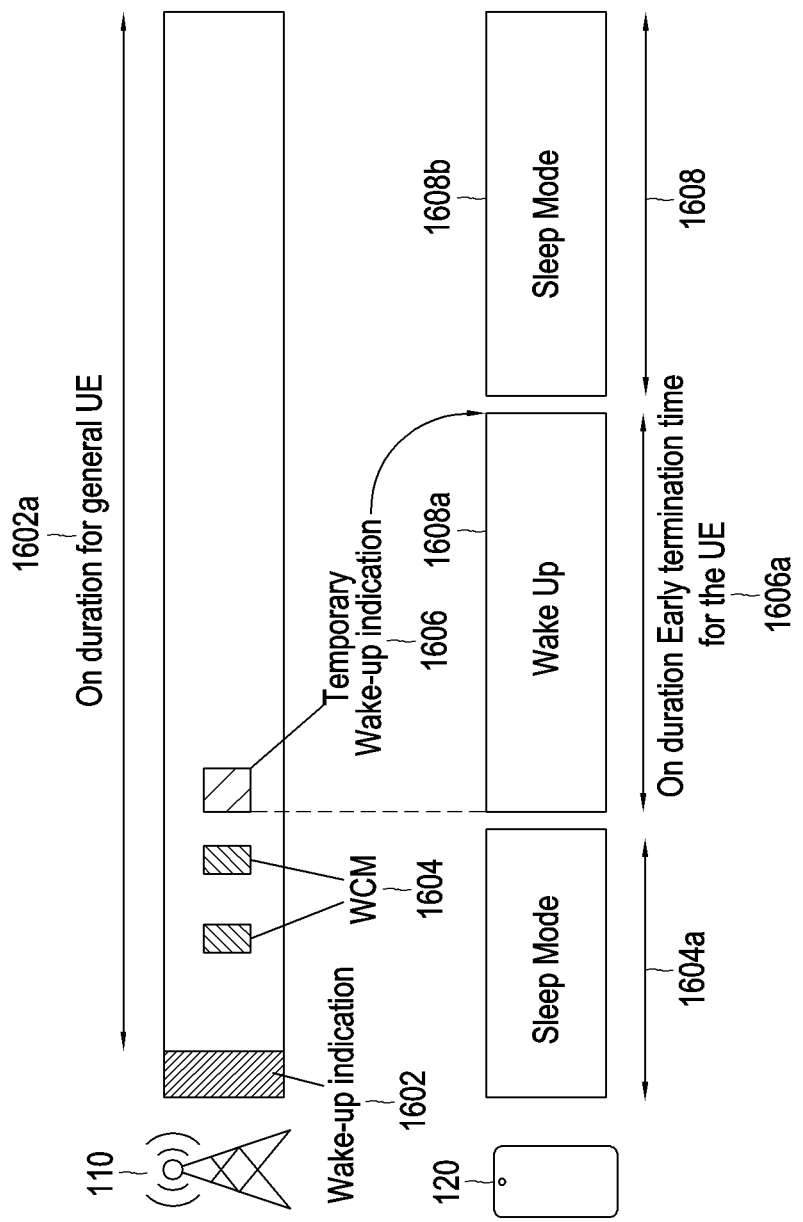
FIG. 16 is a diagram illustrating early wake-up termination based on a temporary WUS according to an embodiment of the disclosure.

FIG. 16 is a diagram illustrating early wake-up termination based on a temporary WUS according to an embodiment of the disclosure.

Referring to FIG. 16, the gNB 110 may instruct the UE 120 to wake up during an 'OnDuration' period 1602a of a specified length by a WUS 1602. The gNB 110 may transmit at least one WCS 1604 to the UE 120 based on detection of consecutive DTXs (not shown) caused by wrong sleep mode 1604a of the UE 120. The gNB 110 may transmit a temporary WUS 1606 to the UE 120 based on reception of an ACK (not shown) corresponding to the at least one WCS 1604.

The UE 120 may end the sleep mode 1604a and start wake-up mode 1606a based on detection of DCI including the temporary WUS 1606. In an embodiment of the disclosure, the temporary WUS 1606 may include information (e.g., N-y) indicating early termination of the 'OnDuration' period 1502a (e.g., N) indicated by the WUS 1502. Herein, y may include a value larger than an offset between a slot in which the WUS 1502 is transmitted and a slot in which the temporary WUS 1506 is transmitted.

The UE 120 may operate in the wake-up mode 1606a until a time 1608a earlier than an end point 1608b of the 'OnDuration' period 1502a based on the temporary WUS 1606. The UE 120 may be kept in the wake-up mode 1606a until a time indicated by the temporary WUS 1506 and then switch to sleep mode 1608.

Figure 17:
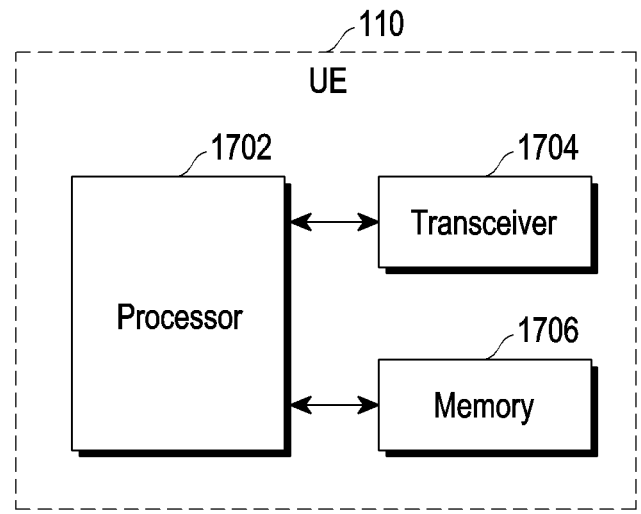
FIG. 17 is a block diagram illustrating a configuration of a gNB in a wireless communication system according to an embodiment of the disclosure.

FIG. 17 is a block diagram illustrating a configuration of the gNB 110 in a wireless communication system according to an embodiment of the disclosure.

Referring to FIG. 17, the gNB 110 may include a processor 1702, a transceiver 1704, and a memory 1706. The processor 1702, the transceiver 1704, and the memory 1706 of the gNB 110 may operate according to the method(s) described in the foregoing embodiments of FIGS. 1 to 16. However, components of the gNB 110 are not limited to the above-described example. For example, the gNB 110 may include more or fewer elements than those described above. In addition, at least one of the processor 1702, the transceiver 1704, or the memory 1706 may be implemented as a single chip.

The transceiver 1704 collectively refers to a receiver and a transmitter, and the gNB 110 may transmit/receive a signal to/from a UE (e.g., the UE 120) or another network entity through the transceiver 1704. The transmitted/received signal may include at least one of control information or data. To this end, the transceiver 1704 may include a radio frequency (RF) transmitter for up-converting and amplifying the frequency of a transmitted signal, and an RF receiver for low-noise amplifying a received signal and down-converting the frequency of the received signal. This is only an example of the configuration of the transceiver 1704, and components of the transceiver 1704 are not limited to the RF transmitter and the RF receiver.

The transceiver 1704 may receive an RF signal in a communication scheme defined in the 3GPP standards, output the received RF signal to the processor 1702, and transmit control information or data output from the processor 1702 to the UE 120 through an RF signal. The transceiver 1704 may receive a signal, output the received signal to the processor 1702, and transmit a signal output from the processor 1702 to another network entity through a network.

The memory 1706 may store programs and data necessary for the operation of the gNB 110 according to at least one of the embodiments of FIGS. 1 to 16. Further, the memory 1706 may store control information and/or data included in a signal obtained by the gNB 110. The memory 1706 may be a storage medium or a combination of storage media such as read only memory (ROM), random access memory (RAM), hard disk, compact disk ROM (CD-ROM), and digital versatile disc (DVD).

The processor 1702 may control a series of operations so that the gNB 110 may operate according to at least one of the embodiments of FIGS. 1 to 16. The processor 1702 may include one or more processing circuits (e.g., an application processor (AP) and/or a communication processor (CP)).

Figure 18:
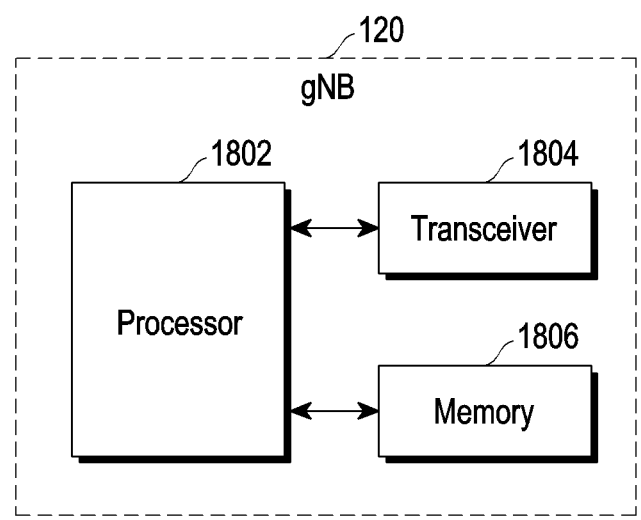
FIG. 18 is a block diagram illustrating a configuration of a user equipment (UE) in a wireless communication system according to an embodiment of the disclosure.

FIG. 18 is a block diagram illustrating a configuration of the UE in a wireless communication system according to an embodiment of the disclosure.

Referring to FIG. 18, the UE 120 may include a processor 1802, a transceiver 1804, and a memory 1806. The processor 1802, the transceiver 1804, and the memory 1806 of the UE 120 may operate according to the method(s) described in the foregoing embodiments of FIGS. 1 to 16. However, the components of the UE 120 are not limited to the above-described example. For example, the UE 120 may include more or fewer components than the afore-mentioned components. In addition, at least one of the processor 1802, the transceiver 1804, or the memory 1806 may be implemented as a single chip.

The transceiver 1804 collectively refers to a receiver and a transmitter, and the UE 120 may transmit/receive a signal to/from a gNB (e.g., the gNB 110) or another network entity through the transceiver 1804. The transmitted/received signal may include at least one of control information or data. To this end, the transceiver 1804 may include an RF transmitter for up-converting and amplifying the frequency of a transmitted signal, and an RF receiver for low-noise amplifying a received signal and down-converting the frequency of the received signal. This is only an example of the configuration of the transceiver 1804, and components of the transceiver 1804 are not limited to the RF transmitter and the RF receiver.

The transceiver 1804 may receive an RF signal in a communication scheme defined in the 3GPP standards, output the received RF signal to the processor 1802, and transmit control information or data output from the processor 1802 to the gNB 110 through an RF signal. The transceiver 1804 may receive a signal, output the received signal to the processor 1802, and transmit a signal output from the processor 1802 to another network entity through a network.

The memory 1806 may store programs and data necessary for the operation of the UE 120 according to at least one of the embodiments of FIGS. 1 to 16. Further, the memory 1806 may store control information and/or data included in a signal obtained by the UE 120. The memory 1806 may be a storage medium or a combination of storage media such as ROM, RAM, hard disk, CD-ROM, and DVD.

The processor 1802 may control a series of operations so that the UE 120 may operate according to at least one of the embodiments of FIGS. 1 to 16. The processor 1802 may include one or more processing circuits (e.g., an AP and/or a CP).

In the above-described embodiments of the disclosure, components included in the disclosure are expressed in singular or plural forms according to the provided specific embodiments. However, the singular or plural expressions are selected appropriately for a presented situation, for convenience of description, and the disclosure is not limited to singular or plural components. Even components expressed in a plural form may be configured as a single one, and even a single component may be configured as a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a base station (BS) for sleep mode control, the method comprising:
transmitting scheduled downlink (DL) data to a user equipment (UE);
in response to the transmission of the scheduled DL data, detecting one or more consecutive discontinuous transmissions (DTX) from the UE at feedback timing corresponding to the DL data;
transmitting downlink control information (DCI) including a wake-up confirming message (WCM) to the UE in response to the detection of the consecutive DTX, wherein the WCM includes failure time information indicating a time at which DL transmission failed; and
determining that the UE is in wake-up mode based on reception of an acknowledgment (ACK) corresponding to the WCM from the UE.

2. The method of claim 1, further comprising:
determining that the UE is in sleep mode based on non-reception of the ACK corresponding to the WCM; and
discontinuing DL data scheduling for the UE based on the determination that the UE is in the sleep mode.

3. The method of claim 1, wherein the failure time information includes at least one offset between at least one slot in which the consecutive DTX is detected and a slot in which the WCM is transmitted.

4. The method of claim 1, further comprising:
transmitting a temporary wake-up indication signal including information about a time period during which the UE wakes up, after the ACK is received.

5. The method of claim 4, wherein the temporary wake-up indication signal includes information indicating a remaining period of an OnDuration period indicated to the UE before the consecutive DTX is detected.

6. The method of claim 4, wherein the temporary wake-up indication signal is broadcast or unicast to the UE.

7. The method of claim 1,
wherein the DCI including the WCM is not accompanied by a physical downlink shared channel (PDSCH), and
wherein the DCI including the WCM is masked with a unique radio network temporary identifier (RNTI) assigned to the UE and transmitted on a physical downlink control channel (PDCCH) to the UE based on a determination that the UE is in wrong sleep mode.

8. The method of claim 1, comprising:
discontinuing DL scheduling for the UE after the consecutive DTX is detected;
receiving uplink control information (UCI) including a wake-up notification message (WNM) from the UE after the DL scheduling is discontinued; and
resuming the DL scheduling for the UE based on the reception of the WNM.

9. The method of claim 8, further comprising:
transmitting a temporary wake-up indication signal including information about a time period during which the UE wakes up to the UE after the WNM is received,
wherein the temporary wake-up indication signal includes information indicating a remaining period of an OnDuration period indicated to the UE before the consecutive DTX is detected, and
wherein the temporary wake-up indication signal includes a value indicating a relative position of a last slot in which the UE is to wake up based on a time at which the temporary wake-up indication signal is transmitted.

10. An apparatus of a base station (BS) for sleep mode control, the apparatus comprising:
a transceiver; and
at least one processor coupled to the transceiver,
wherein the at least one processor is configured to:
transmit scheduled downlink (DL) data to a user equipment (UE),
in response to the transmission of the scheduled DL data, detect one or more consecutive discontinuous transmissions (DTX) from the UE at feedback timing corresponding to the DL data,
transmit downlink control information (DCI) including a wake-up confirming message (WCM) to the UE in response to the detection of the consecutive DTX, wherein the WCM includes failure time information indicating a time at which DL transmission failed, and
determine that the UE is in wake-up mode based on reception of an acknowledgment (ACK) corresponding to the WCM from the UE.

11. The apparatus of claim 10, wherein the at least one processor is further configured to:
determine that the UE is in sleep mode based on non-reception of the ACK corresponding to the WCM, and
discontinue DL data scheduling for the UE based on the determination that the UE is in the sleep mode.

12. The apparatus of claim 10, wherein the failure time information includes at least one offset between at least one slot in which the consecutive DTX is detected and a slot in which the WCM is transmitted.

13. The apparatus of claim 10, wherein the at least one processor is further configured to transmit a temporary wake-up indication signal including information about a time period during which the UE wakes up, after the ACK is received.

14. The apparatus of claim 13, wherein the temporary wake-up indication signal includes information indicating a remaining period of an OnDuration period indicated to the UE before the consecutive DTX is detected.

15. The apparatus of claim 13, wherein the temporary wake-up indication signal is broadcast or unicast to the UE.

16. The apparatus of claim 10,
wherein the DCI including the WCM is not accompanied by a physical downlink shared channel (PDSCH), and
wherein the DCI including the WCM is masked with a unique radio network temporary identifier (RNTI) assigned to the UE and transmitted on a physical downlink control channel (PDCCH) to the UE based on a determination that the UE is in wrong sleep mode.

17. The apparatus of claim 10, wherein the at least one processor is further configured to:
discontinue DL scheduling for the UE after the consecutive DTX is detected,
receive uplink control information (UCI) including a wake-up notification message (WNM) from the UE after the DL scheduling is discontinued, and
resume the DL scheduling for the UE based on the reception of the WNM.

18. The apparatus of claim 17,
wherein the at least one processor is further configured to transmit a temporary wake-up indication signal including information about a time period during which the UE wakes up to the UE after the WNM is received,
wherein the temporary wake-up indication signal includes information indicating a remaining period of an OnDuration period indicated to the UE before the consecutive DTX is detected, and
wherein the temporary wake-up indication signal includes a value indicating a relative position of a last slot in which the UE is to wake up based on a time at which the temporary wake-up indication signal is transmitted.

* * * * *